(No Model.)
J. B. BREWSTER.
CENTRIFUGAL AMALGAMATOR.
No. 393,095. Patented Nov. 20, 1888.
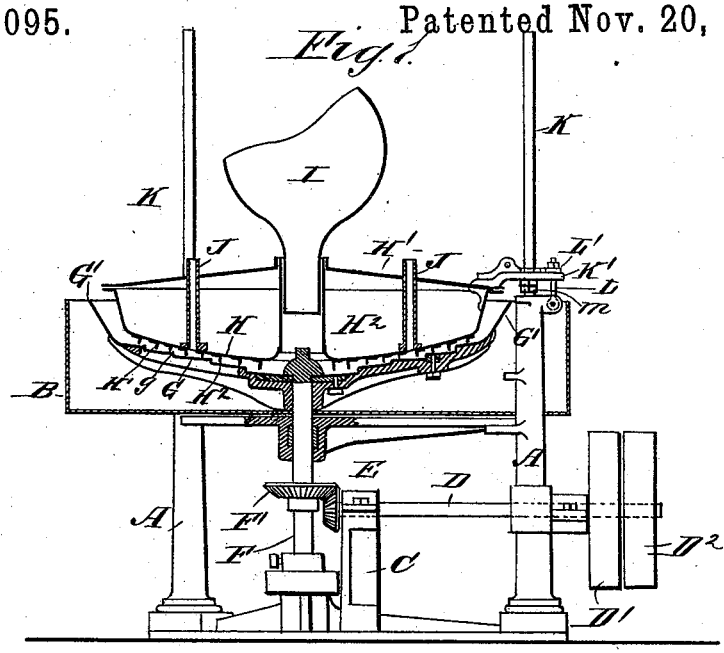
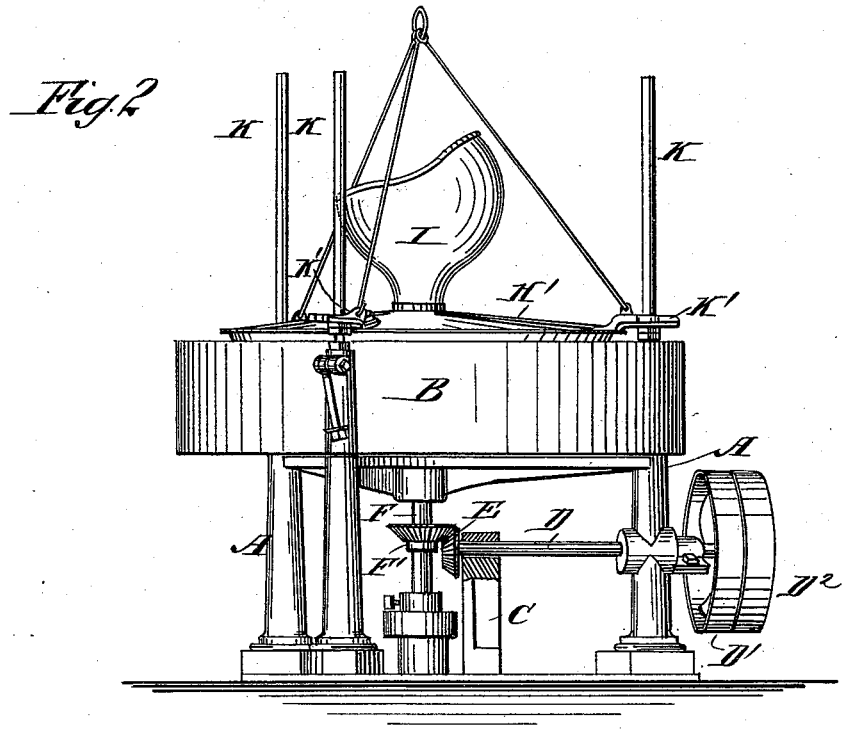
WITNESSES:
INVENTOR:
ATTORNEYS.

UNITED STATES PATENT OFFICE.

JAMES B. BREWSTER, OF NEW YORK, N. Y.

CENTRIFUGAL AMALGAMATOR.

SPECIFICATION forming part of Letters Patent No. 393,095, dated November 20, 1888.

Application filed June 8, 1888. Serial No. 276,471. (No model.)

*To all whom it may concern:*

Be it known that I, JAMES B. BREWSTER, of the city, county, and State of New York, have invented a new and useful Improvement in Centrifugal Amalgamators, of which the following is a full, clear, and exact description.

The object of my invention is to improve the amalgamators described in Letters Patent of the United States, No. 355,958, dated January 11, 1887, and No. 368,363, dated August 16, 1887; and my improvement consists in providing the outer part of the rotary amalgamating-pan, having a series of concentric steps or grooves, with an upwardly and outwardly flaring rim or edge, all of which will be more fully hereinafter described, and pointed out in the claim.

The revoluble pan (shown in the patents herein referred to) is provided with an inwardly-inclined or inwardly-curved edge. This form of edge produces satisfactory results with a small quantity of ore; but when used for a considerable length of time the inwardly-curved edge causes an accumulation of ore by banking on the inner side of the walls under said edge, and thence an inward accumulation over the face of the pan. The result of this accumulation is to cover the mercury on the walls and bottom of the pan, and thereby permit the ore that follows to pass freely over such covered surfaces and pass outward over the edge of the pan without having first been subjected to the action of the mercury. By dispensing with the inwardly-curved edge and substituting therefor an upwardly and outwardly flaring rim I am enabled to overcome these difficulties by causing the ore, after depositing its free gold in the mercury, to pass freely outward over the edges of my pan without banking or leaving an accumulation.

Reference is to be had to the accompanying drawings, forming a part of this specification, in which similar letters of reference indicate corresponding parts in both figures.

Figure 1 is a sectional elevation of an amalgamator embodying my improvement, and Fig. 2 is a perspective view.

The letter A represents three standards or legs, upon which is mounted a casing or outer pan, B.

C is a post. This post and one of the legs A are provided with bearings in which is mounted a shaft, D. The outer end of this shaft is provided with a loose and fixed pulley, $D'$ $D^2$. The inner end of said shaft is provided with a bevel-gear, E.

F indicates a vertically-mounted shaft provided with a bevel-gear, $F'$, in engagement with the gear E. The upper end of the shaft F is centrally fixed to the under side of a pan, G. This pan is provided with a series of concentric steps or grooves, $g$, and an upwardly and outwardly flaring edge, $G'$.

H is a disk mounted above the pan G. Said disk is dished and provided with a cover, $H'$. Said disk is also provided with a central opening, in which is engaged a feed-pipe, $H^2$. The lower end of a hopper, I, is engaged in the upper end of the feed-pipe $H^2$.

J J, Fig. 1, are two air-pipes, each engaged in an opening in the disk H. The feed-pipe $H^2$ and pipes J J extend upward through openings in the cover $H'$. The lower face of the disk H is provided with a series of riffs, so constructed that each set is concentric with the axis of the pan G, above which they are mounted. These riffs are so arranged that one concentric set breaks joint with the adjacent concentric set, as in the aforesaid patents.

The disk H and parts connected therewith are adjustably supported by legs A, which carry upwardly-extending threaded posts K K. Said disk is provided with a series of outwardly-extending arms, $K'$. Each arm $K'$ is recessed or slotted, so as to engage one of the posts K. The upper end of each leg A (shown in Fig. 1) is provided with a threaded bolt, L, pivotally secured thereto, to which bolt is engaged a nut, $L'$. This bolt is adapted to turn inward and outward and engage a slot and lock with an arm, $K'$, as shown. The adjustment to vary the distance between the pan and disk is effected by means of the nuts $m$ on the threaded parts of the posts K.

An amalgamator has been heretofore known and described in Victorian patent, No. 645,624, dated April 25, 1863, in which a rotary pan having a corrugated amalgamated copper plate may be used in connection with a blast for driving the gangue out of the apparatus, and means for condensing the mercurial vapor thereby driven from the pan, and I do not claim such construction; nor do I claim a rotary amalgamating-pan having steps in its bottom, except in combination with an outwardly-inclined edge and under an arrangement substantially such as described, which provides for discharging the gangue over such edge on all sides by centrifugal action solely.

Heretofore stationary ore-concentrators have been provided with hoppers having outwardly-flaring edges, and in one instance a shallow rotary pan having a ring near its edge was proposed in a concentrator; and, further, a rotary amalgamating-pan with vertical walls having rings which inclosed annular pockets between them and one of which was located on the edge of the pan was known prior to my invention, and such matters are not of my invention, which is limited to a pan with the described steps or grooves having no pockets between them and with an inclined edge, the effect being to retard the centrifugal movement of ore by means of the steps until it approaches the circumference, where it is passed over an outwardly-inclined amalgamated surface, as set forth.

Having thus described my invention, what I claim as new, and desire to secure by Letters Patent, is—

The combination, in an amalgamating apparatus, of the rotary pan provided with a series of steps in its bottom and having an upwardly and outwardly flaring edge, mechanism for rotating said pan, and a stationary disk located above and an outer receiving-pan located below said rotary pan, whereby the contents of the rotary pan are thrown up step by step and thence over its free inclined edge on all sides into the outer pan.

JAMES B. BREWSTER.

Witnesses:
FRANK A. FOUTS,
C. SEDGWICK.